United States Patent Office 3,124,557
Patented Mar. 10, 1964

3,124,557
FLAME-PROOF ALKENYL AROMATIC POLYMERS AND METHOD OF MAKING THE SAME
Jacob Eichhorn, Midland, Mich., assignor to The Dow Chemical Company, Midland, Mich., a corporation of Delaware
No Drawing. Filed July 11, 1960, Ser. No. 41,770
11 Claims. (Cl. 260—45.7)

This invention concerns molding compositions of thermoplastic alkenyl aromatic polymers containing certain polychlorinated aliphatic hydrocarbons and peroxygen compounds as agents for conferring flame retardant and self-extinguishing properties to the polymer and pertains to a method for making the same.

It is known that the halogen content of halogen compounds often has an effect of reducing the flammability both of the compounds containing the halogen and of flammable organic materials intimately admixed therewith. There are numerous instances in which the flammability of organic materials such as wood, paper, cellulose derivatives, organic polymers, etc., has ben reduced by admixing organic halogen-containing compounds therewith. It is also known that bromine-containing compounds possess, in most instances, a greater flame-retarding action than do corresponding chlorine-containing compounds.

It is known that organic halogen-containing compounds differ widely among themselves as regards the flame retarding action of the halogen contained therein, and that many organic halogen-containing compounds have little, or no flame-retarding action.

It has now been discovered that flammable alkenyl aromatic polymers may be rendered flame-retardant, i.e. more resistant to ignition and burning, or self-extinguishing by incorporating therewith from 3 to 10 parts by weight of a saturated polychlorinated aliphatic hydrocarbon having from two to four carbon atoms in the molecule and containing from 4 to 10 chlorine atoms, together with from 0.5 to 3 parts by weight of an organic peroxygen compound, each of said ingredients being based on 100 parts by weight of said polymer as measured in the same units of weight.

Suitable organic peroxides to be employed in the invention comprises the relatively non-volatile organic peroxy compounds which are solids or liquids boiling at 100° C. or above at 760 millimeters absolute pressure, containing at least 6 carbon atoms in the molecule, and having at least one tertiary carbon atom attached to an oxygen atom of the peroxy group, and which peroxy compound has a half-life of at least 2 hours as determined in benzene at 100° C., and has the general formula:

$$R[O\!-\!O\!-\!R']_n$$

wherein R is a member of the group consisting of alkyl radicals containing from 2 to 9 carbon atoms, aryl and aralkyl hydrocarbon atoms of the benzene series, the acetyl, the benzoyl, and the phthaloyl radical, R' is a member of the group consisting of hydrogen, alkyl radicals containing from 2 to 9 carbon atoms, and aryl and aralkyl hydrocarbon radicals of the benzene series, and $n$ is a whole number from 1 to 2. Examples of suitable peroxygen compounds are tert.-butyl peracetate, tert.-butyl perbenzoate, di-tert.-butyl diperphthalate, tert.-butyl hydroperoxide, cumene hydroperoxide, dicumyl peroxide, di-tert.-butyl peroxide, diisopropylbenzene hydroperoxide and the like.

A suitable indication of the heat stability of a peroxide can conveniently be obtained by subjecting solutions of the peroxide in benzene to elevated temperatures for various lengths of time and measuring the amount of peroxide left in the solution. This method has been described by D. F. Dernott and O. L. Mageli, The Society of the Plastics Industry, Inc. (preliminary copy of a report to be presented at the 13th annual meeting of the Reinforced Plastics Division). Organic peroxides which have a half-life of 2 hours or more can generally be applied with advantage in the present invention even if the polymer composition containing the peroxide is to be subjected to moderately elevated temperatures.

By an "alkenyl aromatic polymer" is meant a normally solid thermoplastic polymer of one or more polymerizable alkenyl aromatic compounds. For most applications they should comprise, in chemically combined form, at least 70 percent by weight of at least one alkenyl aromatic compound having the general formula:

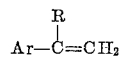

wherein Ar represents an aromatic hydrocarbon radical or a nuclear substituted aromatic halohydrocarbon of the benzene series, and R is a member of the group consisting of hydrogen and the methyl radical. Examples of such alkenyl aromatic polymers are the solid homopolymers and copolymers of one or more monovinyl aromatic compounds such as styrene, vinyltoluene, vinylxylene, ethylvinylbenzene, isopropylstyrene, tert.-butyl styrene, ar-chlorostyrene, ar-dichlorostyrene, fluorostyrene; para-bromostyrene; the solid copolymers of one or more of such alkenyl aromatic compounds with 30 percent by weight or less of other readily polymerizable olefinic compounds such as alpha-methyl styrene, methyl methacrylate, acrylonitrile or with such amounts of natural or a synthetic rubber such as copolymers of from 40 to 80 percent by weight of butadiene and from 60 to 20 percent by weight of styrene.

The polychlorinated aliphatic hydrocarbons to be employed as the chlorine-containing agent in preparing the compositions of the invention can be 1,1,2,2-tetrachloroethane, 1,1,1,2 - tetrachloroethane, pentachloroethane, hexachloroethane, 1,1,1,2-tetrachloropropane, 1,1,2,2-tetrachloropropane, 1,1,1,2,2-pentachloropropane, 1,1,2,3-tetrachloropropane, 1,1,1,2,3-pentachloropropane, heptachloropropane, octachloropropane and mixtures of any two or more of such polychlorinated saturated aliphatic hydrocarbons.

The polychlorinated aliphatic hydrocarbons employed and the organic peroxide or peroxygen compound have a synergistic action of rendering the alkenyl aromatic polymers flame-retardant or self-extinguishing which is not obtained by employing either the aliphatic polychlorohydrocarbon or the organic peroxygen compound alone under similar conditions. The employing of the aliphatic polychlorohydrocarbon together with the peroxide permits the using of the polychlorohydrocarbon in proportions which alone are insufficient to render the polymer self-extinguishing, but in combination with the organic peroxide are effective for making the polymer more flame-retardant or self-extinguishing.

The polychlorinated aliphatic hydrocarbon and the organic peroxide can be incorporated with the polymer by any method which gives uniform distribution of the agents throughout the body of the polymer and which does not cause or result in appreciable deterioration or decomposition of either of said agents.

The polyhydrocarbon can be mixed with the molten polymer in a Banbury mixer, on compounding rolls, or in a plastics extruder or it can be dry blended with the solid polymer in granular form and dissolved when the mixture is melted during subsequent plastic working operations. In such blending operations, the stable organic peroxides can be mixed with the heat-plastified polymer at 150° C. or below and may be mechanically worked at such temperature for a time of not more than about one minute in order to avoid decomposing a substantial proportion of the organic peroxide. In an alternate procedure, particularly if the less stable peroxides are to be used, the polymer, the polychlorohydrocarbon, and the organic peroxide can be dissolved in a common solvent such as methyl chloride, ethyl chloride, benzene, toluene, acetone and the like in the desired proportions and the solvent thereafter evaporated to recover the product.

The invention can be employed for the production of self-extinguishing cellular plastic articles by forming a flowable gel of the polymer consisting essentially of an alkenyl aromatic polymer, e.g. polystyrene, having from 0.05 to 0.4 gram mole of a normally gaseous agent or a volatile organic fluid such as methyl chloride or pentane, dissolved in 100 grams of the polymer, intimately mixing with the gel under pressure at a temperature of 150° C. or below the polychlorohydrocarbon and the organic peroxide while bringing the resulting mixture under pressure to a temperature between about 60° and 130° C. but above the boiling point of the volatile agent, then extruding the gel into a zone of lower pressure sufficient to cause expansion of the extruded material with resultant formation of a cellular article.

The following examples illustrate ways in which the principle of the invention has been applied but are not to be construed as limiting its scope.

EXAMPLE 1

In each of a series of experiments, a charge of 50 grams of polystyrene having a viscosity characteristic of 25 centipoises as determined for a 10 weight percent solution of the polystyrene in toluene at 25° C. was dissolved in 450 grams of liquid methyl chloride. To this solution there was added hexachloroethane and dicumyl peroxide in amounts as stated in the following table, based on the weight of the polystyrene. The resulting solution was allowed to warm to room temperature or thereabout whereby the methyl chloride was flashed off leaving a porous residue having a density of about 25 pounds per cubic foot and consisting of the polystyrene containing the hexachloroethane and the dicumyl peroxide intimately distributed throughout. Test pieces of ¼ x ¼ inch cross-section by 2 inches long were cut from the porous polystyrene. These test pieces were used to determine the self-extinguishing characteristics for the polystyrene composition. The procedure for determining the self-extinguishing characteristic was to hold a test piece by one end in a horizontal position then hold a microburner having a 1 inch flame under the free end until the test piece ignited. The flame was then removed and the time in seconds for the flame to be self-extinguished was measured. When a test piece burned for 20 seconds or longer, it was considered as unsatisfactory and was reported as "burns." Table I identifies the experiments and gives the parts by weight of polystyrene and hexachloroethane in the composition, together with the parts by weight, based on 100 parts of the polystyrene, of the dicumyl peroxide employed. The table also gives the self-extinguishing characteristics determined for the compositions.

Table I

| Run No. | Starting Materials | | | Product—Time to be Self-Extinguished, Sec. |
|---|---|---|---|---|
| | Polystyrene, Parts | Hexachloroethane, Parts | Dicumyl Peroxide, Parts | |
| 1 | 100 | 2 | 0.5 | Burns |
| 2 | 100 | 3 | 0.5 | 9.5 |
| 3 | 100 | 5 | 0.5 | 6.0 |
| 4 | 100 | 6 | 0.5 | 5.4 |
| 5 | 100 | 7 | 0.5 | 4.5 |
| 6 | 100 | 10 | 0.5 | 3.6 |
| 7 | 100 | 10 | none | Burns |
| 8 | 100 | 6 | 1.0 | 2.0 |
| 9 | 100 | 8 | 1.0 | 1.0 |
| 10 | 100 | 10 | 1.0 | 1.0 |
| 11 | 100 | 10 | 0.25 | 0.8 |

EXAMPLE 2

In each of a series of experiments, a composition consisting of polystyrene similar to that employed in Example 1, symmetrical tetrachloroethane and dicumyl peroxide was prepared and tested for its self-extinguishing characteristics employing procedures similar to those described in Example 1. Table II identifies the compositions and gives the proportions of polystyrene, 1,1,2,2-tetrachloroethane and dicumyl peroxide employed in preparing the same. The table also gives the self-extinguishing characteristic observed for the composition.

Table II

| Run No. | Starting Materials | | | Product—Time to be Self-Extinguished Sec. |
|---|---|---|---|---|
| | Polystyrene, Parts | 1,1,2,2-Tetra-Chloroethane, Parts | Dicumyl Peroxide, Parts | |
| 1 | 100 | 5 | 1 | Burns |
| 2 | 100 | 7 | 1 | 7 |
| 3 | 100 | 10 | 1 | 5.5 |
| 4 | 100 | 10 | 0 | Burns |
| 5 | 100 | 10 | 1 | 5.5 |
| 6 | 100 | 10 | 2 | 1.6 |
| 7 | 100 | 10 | 3 | 1.8 |

EXAMPLE 3

In each of a series of experiments, a composition consisting of polystyrene, pentachloroethane and dicumyl peroxide was prepared employing the ingredients in proportions as stated in the following table and using procedures similar to those employed in Example I. Table III identifies the compositions and gives the self-extinguishing characteristics determined for the same.

Table III

| Run No. | Starting Materials | | | Product—Time to be Self-Extinguished Sec. |
|---|---|---|---|---|
| | Polystyrene Parts | Pentachloroethane Parts | Dicumyl Peroxide Parts | |
| 1 | 100 | 5 | 1 | 11 |
| 2 | 100 | 7 | 1 | 7 |
| 3 | 100 | 10 | 1 | 4 |
| 4 | 100 | 10 | 0 | Burns |

EXAMPLE 4

In each of a series of experiments, a composition consisting of 100 parts by weight polystyrene similar to that employed in Example 1, ten parts by weight of hexachloroethane and a peroxygen compound in proportion and kind as identified in the following table was prepared and tested for its self-extinguishing characteristics employing procedures similar to those described in Example 1. Table IV identifies the composition and gives the kind and amount of the peroxygen compound employed in making the composition. The table also gives the self-extinguishing characteristics determined for the compositions.

Table IV

| Run No. | Flame-Proofing Agents | | | Time to be Self-Extinguished, Sec. |
|---|---|---|---|---|
| | Peroxygen Compound | | Hexachloroethane, Parts | |
| | Kind | Parts | | |
| 1 | t.-Butyl perbenzoate | 1 | 10 | 2.2 |
| 2 | di-t.-Butyl diperphthalate | 1 | 10 | 1.4 |
| 3 | Cumene Hydroperoxide | 1 | 10 | 16.0 |
| 4 | ----do---- | 2 | 10 | 5.4 |

EXAMPLE 5

In each of a series of experiments, a composition consisting of molding grade polystyrene, heptachloropropane and dicumyl peroxide in proportions as stated in the following table was prepared and tested for its self-extinguishing characteristics employing procedures similar to those described in Example 1. Table V identifies the compositions and gives the proportions of the ingredients employed in making the same. The table also gives a self-extinguishing characteristic determined for the composition.

Table V

| Run No. | Starting Materials | | | Product— Time to be Self-Extinguished, Sec. |
|---|---|---|---|---|
| | Polystyrene, Parts | Heptachloropropane, Parts | Dicumyl Peroxide, Parts | |
| 1 | 100 | 10 | None | Burns |
| 2 | 100 | 10 | 0.5 | 2 |
| 3 | 100 | 7 | 0.5 | 4.5 |
| 4 | 100 | 6 | 0.5 | 7.5 |
| 5 | 100 | 5 | 0.5 | 8 |
| 6 | 100 | 3 | 0.5 | 14 |
| 7 | 100 | 3 | 1 | 7.2 |
| 8 | 100 | 5 | 1 | 3.8 |
| 9 | 100 | 6 | 1 | 3.2 |
| 10 | 100 | 7 | 1 | 1.5 |
| 11 | 100 | 10 | 1 | 1 |

EXAMPLE 6

Compositions of polystyrene, octachloropropane and dicumyl peroxide in proportions as stated in the following table were prepared and tested for self-extinguishing characteristics employing procedures similar to those described in Example 1. For purpose of comparison, compositions without the dicumyl peroxide were prepared and tested in similar manner. Table VI identifies the compositions and gives the results obtained.

Table VI

| Run No. | Starting Materials | | | Product— Time to be Self-Extinguished, Sec. |
|---|---|---|---|---|
| | Polystyrene, Parts | Octachloropropane, Parts | Dicumyl Peroxide, Parts | |
| 1 | 100 | 3 | None | Burns |
| 2 | 100 | 3 | 1 | 5 |
| 3 | 100 | 5 | None | Burns |
| 4 | 100 | 5 | 1 | 2 |
| 5 | 100 | 10 | None | 16 |
| 6 | 100 | 10 | 1 | 1 |

EXAMPLE 7

A composition consisting of 100 parts by weight of polystyrene, 10 parts of trichloropropane and 1 part of dicumyl peroxide was prepared and tested for self-extinguishing characteristics employing procedures similar to those described in Example 1. The composition when ignited in an open flame and then removed from the flame was self-extinguished in 12 seconds.

EXAMPLE 8

A composition consisting of 100 parts by weight of polystyrene, 10 parts by weight of a mixture consisting of 85 percent by weight of tetrachloroethane and 15 percent of pentachloroethane, and 1 part by weight of dicumyl peroxide was prepared and tested employing procedures similar to those described in Example 1. The composition when ignited in an open flame and then removed from the flame was self-extinguished in 9 seconds.

EXAMPLE 9

A composition consisting of 100 parts by weight of polystyrene, 10 parts by weight of a mixture consisting of 55 percent by weight of tetrachloroethane and 45 percent of pentachloroethane, and 1 part of dicumyl peroxide was prepared and tested employing procedures similar to those employed in Example 1. The composition when ignited in an open flame and then removed from the flame was self-extinguished in 5 seconds.

I claim:

1. A resinous composition of matter consisting essentially of a thermoplastic alkenyl aromatic polymer of at least 70 percent by weight of at least one alkenyl aromatic compound having the general formula:

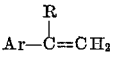

wherein Ar represents an aromatic radical of the group consisting of hydrocarbon and halohydrocarbon radicals of the benzene series and R is a member of the group consisting of hydrogen and the methyl radical, having intimately incorporated therewith from 3 to 10 parts by weight of a saturated aliphatic polychlorohydrocarbon containing from 2 to 4 carbon atoms and from 4 to 10 chlorine atoms in the molecule and from 0.5 to 3 parts by weight of an organic peroxygen compound having a half-life of at least 2 hours at 100° C., and having the general formula:

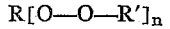

wherein R represents a member of the group consisting of alkyl radicals having from 2 to 9 carbon atoms, and aryl and aralkyl hydrocarbon radicals of the benzene series, the acetyl, the benzoyl and the phthaloyl radical, R' is a member of the group consisting of hydrogen, alkyl radicals containing from 2 to 9 carbon atoms, and aryl, aralkyl hydrocarbon radicals of the benzene series, and $n$ is a whole number from 1 to 2, each of said polychlorohydrocarbon and said peroxygen compound being based on 100 parts by weight of said polymer.

2. A composition according to claim 1, wherein the organic peroxygen compound is dicumyl peroxide.

3. A composition according to claim 1, wherein the alkenyl aromatic polymer is polystyrene.

4. A composition according to claim 1, wherein the aliphatic polychlorohydrocarbon is hexachloroethane.

5. A composition according to claim 4, wherein the organic peroxygen compound is tert.-butyl perbenzoate.

6. A composition according to claim 4, wherein the organic peroxygen compound is di-tert.-butyl diperphthalate.

7. A composition according to claim 4, wherein the organic peroxygen compound is cumene hydroperoxide.

8. A composition according to claim 1, wherein the aliphatic polychlorohydrocarbon is tetrachloroethane.

9. A composition according to claim 1, wherein the aliphatic polychlorohydrocarbon is heptachloropropane.

10. A composition according to claim 1, wherein the aliphatic polychlorohydrocarbon is octachloropropane.

11. A composition according to claim 1, wherein the aliphatic polychlorohydrocarbon is pentachloroethane.

References Cited in the file of this patent

UNITED STATES PATENTS 2,676,946   McCurdy et al. _____ Apr. 27, 1954

FOREIGN PATENTS 810,551   Great Britain _____ Mar. 18, 1954